Dec. 27, 1960  W. P. JUDGE ET AL  2,965,919
ANIMAL STUNNING DEVICES
Filed Sept. 25, 1958
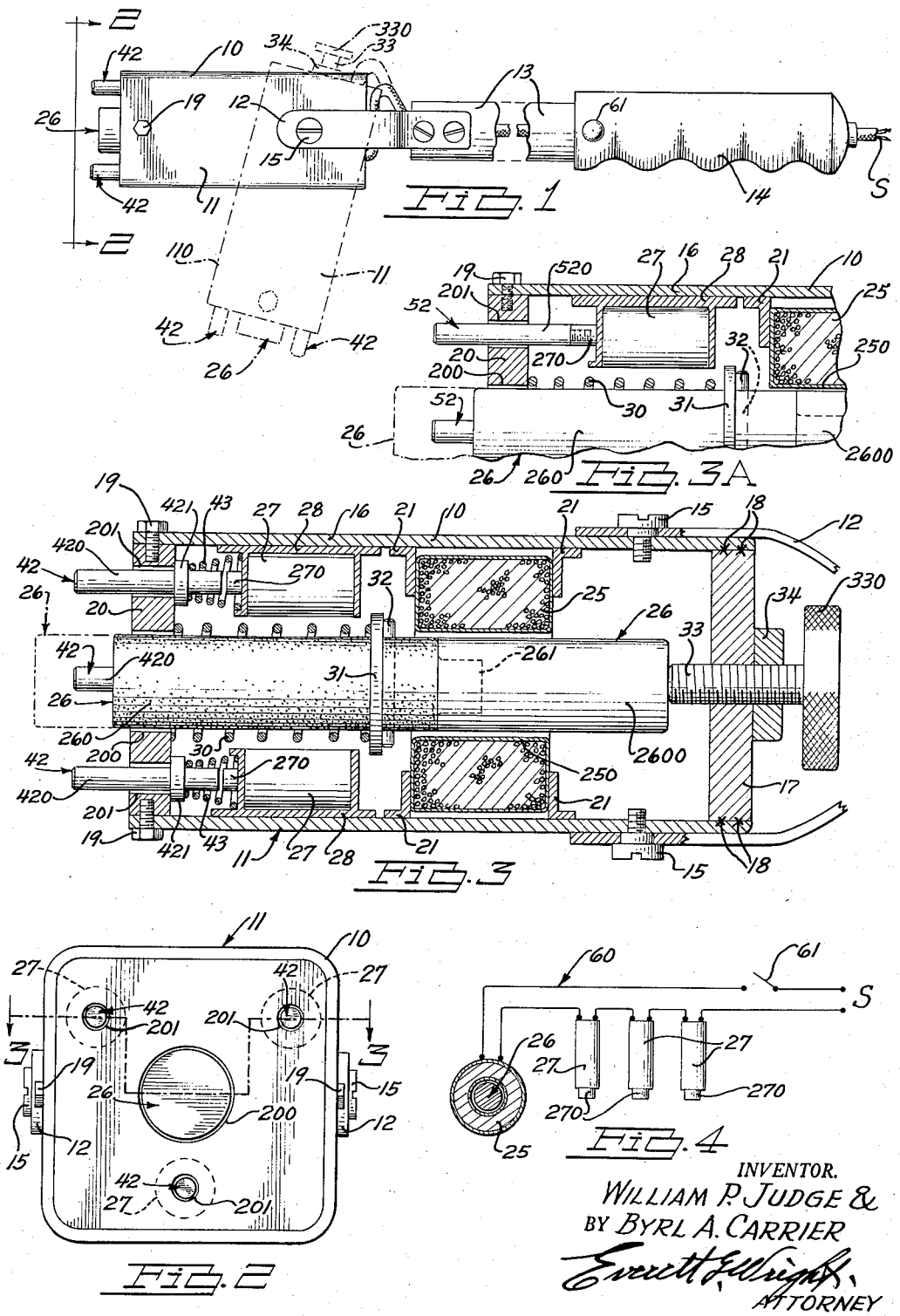
INVENTOR.
WILLIAM P. JUDGE &
BY BYRL A. CARRIER
Everett G. Wright
ATTORNEY

United States Patent Office

2,965,919
Patented Dec. 27, 1960

2,965,919

ANIMAL STUNNING DEVICES

William P. Judge, 10377 Stoepel, Detroit 4, Mich., and Byrl A. Carrier, 4090 Lamont, Drayton Plains, Mich.

Filed Sept. 25, 1958, Ser. No. 763,251

4 Claims. (Cl. 17—1)

This invention relates to animal stunning devices adapted to humanely stun animals such as cattle and the like prior to slaughter.

The primary object of the invention is to provide an improved and simplified stunner for animals which will positively eliminate glancing ineffective blows and thereby assures instant humane stunning of an animal prior to slaughter.

Another object of the invention is to provide an improved stunner for animals including means for driving a stunning pin against an animal's head, and triggering means adapted to actuate said stunning pin driving means to strike a stunning blow only when disposed in a direction normal to the area of contact of the stunning device against the animal's head.

Other objects of the invention will become apparent by reference to the following detailed description taken in connection with the accompanying drawings, in which:

Fig. 1 is a side elevational view of an animal stunning device embodying the invention.

Fig. 2 is an end elevational view taken on the line 2—2 of Fig. 1.

Fig. 3 is an enlarged longitudinal sectional view taken on the line 3—3 of Fig. 2.

Fig. 3-A is an enlarged fragmentary sectional view similar to Fig. 3 showing an alternate construction of the triggering means disclosed in Fig. 3.

Fig. 4 is a wiring diagram showing an electric circuit preferably employed.

Referring now to the drawings wherein like reference numerals refer to like and corresponding parts throughout the several views, the particular embodiment of an animal stunning device 10 disclosed in the drawings for the purpose of illustrating the invention consists of a stunner body or housing 11 preferably pivotally mounted on a bifurcated bracket or bail 12 fixed on a suitable handle 13 including a pistol type grip 14 of a form which would admit of using the said stunning device 10 for extended periods of time without excessive fatigue. The said stunner housing 11 is fixed in any desired angular relationship with respect to the handle 13 as indicated by the full and the dot and dash lines 110 in Fig. 1 by means of suitable combined pivots and securing studs 15 extending through the bail 12 and threaded into opposite walls of the tubular casing 16 of the stunner housing 11.

The stunner housing 11 consists of a longitudinally disposed tubular casing 16 into the rear end of which a tail member 17 is secured by such means as the welds 18. A head member 20 is secured into the front end of the said tubular casing of the stunner housing 11 by such means as a plurality of studs 19. Within the housing 11 is fixed a solenoid 25 by such means as a pair of brackets 21 fixed to the said tubular casing 16 with the solenoid core 250 disposed axially central of the said tubular casing 16. A stunning pin 26 is reciprocatingly mounted within the solenoid core 250 of the solenoid 25 and extends through a central aperture 200 in the head member 20 of the stunner housing 11. Also, within the said housing 11 are fixed a plurality of spring loaded normally open switch means such as micro switches 27 located in circumferential spaced relationship around said stunning pin 26, the said micro switches 27 being preferably mounted in suitable mounting brackets or carriers 28 which are fixed to the interior of the said casing 16 in any desired manner.

The stunning pin 26 is spring loaded by a relatively light compression spring 30 to its retracted position as shown by full lines in Figs. 3 and 3-A. The said compression spring 30 is disposed around the stunning pin 26 between a washer 31 axially fixed thereon and the inner face of the head member 20 of the housing 11. A diametrically disposed pin 32 extending through the stunning pin 26 fixes the said washer 31 against axial movement on the said stunning pin 26. The length of the stroke of the stunning pin 26 is adjusted by a stop pin 33 having a knurled head 330 threaded through the tail member 17 of the housing 11. A lock nut 34 threaded on the stop pin 33 locks the said stop pin 33 in any adjusted position. The extended position of the stunning pin 26 to which it is driven by the solenoid 25 is indicated by the dot and dash lines in Figs. 3 and 3-A.

The said stunning pin 26 is formed of two portions 260 and 2600 secured together axially by such means as brazing or the like at a cylindrical dovetail 261 as indicated in Fig. 3. The forward end 260 of the stunning pin 26 is of a non-magnetic material, and the rearward end 2600 of the said stunning pin 26 is of a magnetic material. With such construction, the stunning pin 26 may be adjusted axially of the solenoid 25 in a selected retracted position by the stop pin 33 to vary the length of the stroke of the stunning pin 26 and the force of the blow struck thereby when the solenoid 25 is actuated.

In the solenoid circuit 60 shown in Fig. 4 an Off-On switch 61 is employed to close the said solenoid circuit to an electric power source S. The solenoid 25 and the plurality of spring loaded open switches 27 are connected in series. When the said On-Off switch 61 preferably mounted in the pistol grip 14 of the stunning device 10 is closed, the stunning device 10 is ready for operation. Thereafter, all of the plurality of spring loaded switches 27 must be closed simultaneously to actuate the solenoid 25 causing it to drive the stunning pin 26 of the stunning device 10 outwardly from the housing 11 to strike a forceful blow.

To assure that the stunning pin 26 always strikes a blow normal to a selected area of the animal's head, a trigger means is employed consisting of spring loaded open switches 27 located in circumferential spaced relationship around the said stunning pin 26 as shown in Figs. 2 and 3. The said spring loaded open switches 27 are each preferably mounted within the housing 11 on the tubular casing 16 thereof by means of a suitable mounting bracket 28 as indicated in Figs. 3 and 3-A. The head member 20 of the housing 11 is provided with a plurality of apertures 201 therethrough to permit the trigger 42 operating each of the spring loaded open switches 27 of the trigger means to reciprocate therethrough.

In Fig. 3, the trigger 42 of each spring loaded open switch of the trigger means is shown to consist of two pieces, namely, an animal contact portion 420 and a spring loaded switch closing plunger portion 270 which may be an element of the spring loaded open solenoid circuit switch 27. The animal contact portion 420 and the switch closing plunger portion 270 of each trigger 42 is shown in Fig. 3 to be slightly axially spaced. A compression spring 43 disposed between a collar 421 on the animal contact portion 420 of each trigger 42 and the mounting bracket 41 of a said solenoid circuit switch 40 constantly urges the said animal contact pin portion 420 of the trigger 42 outwardly in a switch-open position as shown in Fig. 3. The switch closing plunger portion 270 of the trigger 42 is also shown in its normal spring loaded open position in Fig. 3.

When the outer or trigger end of the animal stunning device 10 is placed firmly against the proper area of the head of an animal to be stunned, all of the triggers 42 of the trigger means will be depressed simultaneously, all of the plurality of the normally spring loaded open solenoid circuit switches 27 will close, and the solenoid 25 will drive the stunning pin 26 squarely against the animal's head. With the stunning device 10 and its trigger means, a stunning blow can only be delivered in a direction normal to the area against which the plurality of triggers 42 are simultaneously placed, thusly assuring positive and humane stunning of animals prior to slaughter.

In Fig. 3-A is shown triggers 52 extending from the apertures 201 of the head member 20 of the housing 11 of the stunning device 10. These triggers 52 are like and similar to the triggers 42 except that the animal contact portion 520 thereof are fixed to the free end of the switch closing plunger portion 270 thereof, the latter being an element of a spring loaded open solenoid circuit switch 27. If desired, the animal contact portion 520 and the switch closing plunger portion of the triggers 52 may be integral rather than of two piece construction as shown in the drawing. With the exception of not having the slightly delayed action obtained with the trigger construction 42 shown in Fig. 3, the trigger construction 52 shown in Fig. 3-A functions like and similar thereto.

Although but one specific embodiment of the invention and one modification of an element thereof has been disclosed and described in detail, it is obvious that many changes may be made in the size, shape, arrangement and detail of the various elements of the invention, all within the scope of the appended claims.

We claim:

1. An animal stunning device comprising a housing, a solenoid mounted in said housing and including a power circuit thereto, a stunning pin reciprocatingly mounted through the core of said solenoid extending when in its normal retracted position slightly through one end of said housing, spring means urging said stunning pin to its retracted position, said solenoid driving said stunning pin to an extended position to strike a blow when actuated, a plurality of series connected normally spring loaded open solenoid actuating switches in said power circuit mounted in said housing, a switch closing plunger for each solenoid actuating switch extending from said housing and circumferentially spaced around said stunning pin movable axially of said stunning pin to close said solenoid actuating switches when all said switch closing plungers are placed firmly and squarely on the head of an animal to be stunned whereupon said solenoid is actuated to said stunning pin in an extended position to strike a stunning blow on the head of the animal in a direction only normal to the area against which said switch closing plungers are placed.

2. An animal stunning device comprising a housing, a solenoid mounted in said housing and including a power circuit thereto, a stunning pin reciprocatingly mounted through the core of said solenoid and one end of said housing, spring means urging said stunning pin in a retracted position with respect to said end of said housing, said solenoid being adapted to drive said stunning pin in an extended position from said housing to strike a blow when actuated, trigger means consisting of a plurality of series connected normally spring loaded open solenoid actuating switches in said power circuit mounted in said housing, and a switch closing plunger for each solenoid actuating switch extending in spring loaded relationship from said housing circumferentially spaced around said stunning pin movable axially of said stunning pin adapted to contact and close said solenoid actuating switches responsive to axial depression thereof when all said switch closing plungers are placed firmly and squarely on the head of an animal to be stunned, the said solenoid driving said stunning pin in an extended position to strike a stunning blow on the head of the animal only in a direction normal to the area on the animal's head against which said switch closing plungers are simultaneously depressed, said switch closing plungers and said solenoid activating switches being normally axially spaced whereby to provide a delayed closing of said solenoid circuit responsive to depression of said switch closing plungers.

3. An animal stunning device comprising a housing, a solenoid mounted in said housing having a hollow axially disposed core and including a power circuit thereto, a stunning pin reciprocatingly mounted through said solenoid core and extending when in its normal retracted position slightly through one end of said housing, spring means urging said stunning pin to its retracted position, a plurality of normally spring loaded open solenoid actuating switches mounted in said housing and connected in series in said solenoid power circuit, a spring loaded switch closing plunger for each solenoid actuating switch reciprocably extending from said housing and circumferentially spaced around said stunning pin, each switch closing plunger being movable to close one solenoid actuating switch when the plunger end of said stunning device is placed firmly on the head of an animal to be stunned, the said solenoid circuit remaining open until all said solenoid actuating switches are closed responsive to squarely placing all said switch closing plungers on the head of an animal to be stunned whereupon said solenoid drives said stunning pin in an extended position to strike a stunning blow only normal to the area upon which said switch closing plungers are placed.

4. An animal stunning device comprising a housing, a solenoid mounted in said housing having a hollow axially disposed core and including a power circuit thereto, a stunning pin reciprocatingly mounted through said solenoid core and adapted to extend through one end of said housing, spring means urging said stunning pin in a retracted position, a trigger mechanism consisting of a plurality of normally spring loaded open solenoid actuating switches mounted in said housing and connected in series in said solenoid power circuit, an independent trigger in the form of a switch closing plunger for each solenoid actuating switch extending from said housing circumferentially spaced around said stunning pin movable axially in respect to said housing to close one solenoid actuating switch when the trigger end of said stunning device is placed firmly on the head of an animal to be stunned, the said solenoid circuit being closed only when all said solenoid actuating switches are closed responsive to squarely placing all said triggers of said trigger mechanism firmly against the head of an animal to be stunned whereupon said solenoid drives said stunning pin in an extended position to strike a stunning blow normal to the area upon which said switch closing plungers are placed, and means for adjusting the stroke of the stunning pin whereby to govern the force of the blow struck thereby.

References Cited in the file of this patent

UNITED STATES PATENTS

| 773,122 | Christmas | Oct. 25, 1904 |
| 1,655,671 | Watkins | Jan. 10, 1928 |
| 2,636,601 | Bovay et al. | Apr. 28, 1953 |
| 2,707,503 | Johnson et al. | May 3, 1955 |
| 2,809,391 | Brooks et al. | Oct. 15, 1957 |